Patented Feb. 8, 1949

2,461,359

UNITED STATES PATENT OFFICE 2,461,359

INHIBITING ACIDIC CORROSION IN WELLS

Prentiss S. Viles and Elza Q. Camp, Goose Creek, Tex., assignors to Standard Oil Development Company, a corporation of Delaware No Drawing. Application January 26, 1946, Serial No. 643,758

6 Claims. (Cl. 252—8.55)

The present invention is directed to the production of fluids from underground formations. More particularly the invention is directed to protecting the conduits and attendant equipment, through which fluids from subsurface formations are flowed and processed, from corrosion by materials occurring in or are introduced into fluids originating in subsurface formations.

In many oil, gas, and condensate fields, the production of fluids from subsurface formations is accompanied by extremely severe corrosion of the conduits and attendant equipment which comes into contact with the fluid mixture being produced. In many cases it is found that the fluid mixture is acidic in nature and comprises substantial amounts of carbon dioxide, a portion of which dissolves in water present to form carbonic acid. In addition to the carbon dioxide other materials which are present in the corrosive mixture may include organic acids, inorganic acids, inorganic salts and acidic sulfur compounds. These corrosive substances occur in or are introduced into the fluids originating in the subsurface formations. In some cases the corrosion occurs throughout the conduits and attendant equipment through which the fluids from the subsurface formations are flowed and processed. In other cases the corrosion is limited primarily to portions of the conduits near the surface of the wells and to the wellhead and attendant equipment. In all cases it has been necessary to make extensive replacements of equipment that has failed as a result of corrosion. This not only limits production, but is extremely expensive, particularly in those cases in which it is necessary to kill a high pressure well in order to make repairs and to replace corroded equipment. In addition to the high costs of making repairs to well equipment, there is a marked loss in revenues due to having a well off production and to the necessity of having to maintain additional wells and sources of supply to meet production requirements during periods in which a well is off production for repairs as a result of corrosion. Further, there is constant danger that a well will flow wild as a result of the failure of equipment due to corrosion. In cases of this kind, enormous losses are incurred.

It is, therefore, the main object of the present invention to provide a method whereby corrosion is substantially eliminated or inhibited in the conduits and attendant equipment through which fluids from subsurface formations are flowed and processed.

In accordance with the present invention, corrosion of metallic surfaces is inhibited or substantially eliminated by adding small amounts of hydrogen sulfide to fluids produced from subsurface formations which are acidic in nature and include carbon dioxide.

The amount of hydrogen sulfide employed to inhibit the corrosion of the ferrous metal surfaces by the fluid mixtures produced from subsurface formations may be varied over a wide range and satisfactory results obtained. Inasmuch as hydrogen sulfide is usually an undesirable constituent in the hydrocarbon fluid being obtained, it is preferable usually to employ only very small amounts thereof to inhibit the corrosion but in some cases the use of large amounts of hydrogen sulfide may be desirable or necessary and in such instances the hydrogen sulfide may be added in an amount up to 3% by weight based on the weight of fluid mixture produced from the subsurface formation. As has been stated above, it will usually be found that minor amounts of hydrogen sulfide will be effective for inhibiting corrosion of the ferrous metal surfaces and, accordingly, under many operating conditions the amount of hydrogen sulfide used for effectively inhibiting corrosion may be 0.1% or even as low as 0.01% by weight of the fluid mixture being produced.

It may be found that after an effective amount of hydrogen sulfide has been employed to inhibit corrosion of the ferrous metal surfaces, a lower amount maintained in the fluid will be effective thereafter and maintain the inhibiting effect. Accordingly, a convenient method for practicing the present invention involves the employment of a substantial amount of hydrogen sulfide, as of the order of 1% by weight of the fluid produced, for a period sufficient to cause corrosion of the ferrous metal surfaces to be effectively inhibited and thereafter much smaller amounts, as of the order of 0.01% of hydrogen sulfide based on the weight of the fluid produced, may be employed to maintain the inhibited condition of the metallic surfaces.

The hydrogen sulfide may be injected into the corrosive mixture as such or alternatively it may be dissolved or suspended in a suitable vehicle. The inhibiting fluid, that is, either the hydrogen sulfide itself or the solution or suspension of hydrogen sulfide may be added to the corrosive fluid mixture produced from the subsurface formation in any convenient manner. For example, the inhibiting solution may be injected into the borehole adjacent the subsurface formation from which the fluid mixture is produced or it may be injected into a conduit through which the corrosive fluid flows from the subsurface to the surface of the earth. Another method of using the inhibited fluid is by injecting it directly into the subsurface reservoir by employing an adjacent well; it will be apparent that when adding the inhibiting agent in accordance with this procedure the fluid entering the borehole of the producing well will comprise the inhibiting agent.

An advantage of the process of the present invention, irrespective of the suppression of corrosion of the conduits and attendant equipment through which fluids from subsurfaces formations are flowed and processed, is the ability to operate without interruptions due to failure of equipment. The danger of a well flowing wild is minimized and the necessity of having a surplus of wells to insure production is eliminated.

In order to illustrate further the beneficial effects of the present invention, the following example is given:

EXAMPLE

Test pieces of carbon steel were immersed in separate portions of distilled water. One of the solutions was employed as a blank with no inhibiting material added while another solution was saturated with hydrogen sulfide under atmospheric pressure. The two solutions were then maintained under a pressure of 100 lbs. per sq. in. gage of carbon dioxide at a temperature of 170° F. for an interval of 24 hours. The carbon dioxide was admitted to the system through a pressure regulator valve, thus maintaining a constant pressure of carbon dioxide on the system so that the water solution in which the carbon steel test specimens were immersed were saturated with carbon dioxide at a temperature and pressure at which the tests were conducted. The results obtained in the tests are shown in the following table:

Table

| Inhibiting Material | Corrosion Rate, Inches per Year | Reduction of Corrosion by Inhibition, per cent |
|---|---|---|
| None | 0.2250 | |
| $H_2S$ | 0.0235 | 89.6 |

It will be observed from the data presented in the foregoing table that the addition of hydrogen sulfide effects a marked reduction in the tendency of a corrosive water solution to corrode carbon steel.

The nature and objects of the present invention having been fully described and illustrated, what we desire to claim as new and useful and to secure by Letters Patent is:

1. A method for reducing the corrosiveness to corrodible ferrous metal of a corrosive fluid including moisture, petroleum hydrocarbons and a corrosion-producing amount of carbon dioxide which comprises introducing into said fluid a corrosion inhibiting amount of hydrogen sulfide free from other corrosion preventing agents.

2. A method in accordance with claim 1 in which the hydrogen sulfide added to the corrosive fluid is in an amount up to 3% by weight of the fluid.

3. A method in accordance with claim 1 in which the hydrogen sulfide introduced into said fluid is in the range of 0.01% to 0.10% by weight of the fluid.

4. A method for reducing the corrosiveness to corrodible ferrous metal of a corrosive fluid including a major portion of petroleum hydrocarbons, a minor portion of moisture and a corrosion-producing amount of carbon dioxide which comprises introducing into said fluid a corrosion inhibiting amount of hydrogen sulfide free from other corrosion preventing agents.

5. A method in accordance with claim 4 in which said ferrous metal is a conduit through which said corrosive fluid is withdrawn from a subsurface formation and in which said hydrogen sulfide is introduced directly into said conduit.

6. A method in accordance with claim 4 in which the hydrogen sulfide introduced into said fluid is in the range of 0.01% to 0.10% by weight of the fluid.

PRENTISS S. VILES.
ELZA Q. CAMP.

REFERENCES CITED

The following references are of record in the file of this patent:

UNITED STATES PATENTS

| Number | Name | Date |
|---|---|---|
| 1,829,705 | Walker | Oct. 27, 1931 |
| 1,873,084 | Walker | Aug. 23, 1932 |
| 2,361,149 | Perquin | Oct. 24, 1944 |
| 2,366,936 | Schulze | Jan. 9, 1945 |
| 2,385,175 | Wachter et al. | Sept. 18, 1945 |

OTHER REFERENCES

Formaldehyde vs. Sulfide Corrosion, article in Industrial and Engineering Chemistry, vol. 38, Jan. 16, 1946, pp. 10 and 14 (Industrial Edition).